United States Patent Office 3,018,218
Patented Jan. 23, 1962

3,018,218
DIHALOGENOPROPYNES AS SOIL FUMIGANTS
William E. Duggins, Berkley Heights, N.J., assignor to General Aniline & Film Corporation, New York, N.Y., a corporation of Delaware
No Drawing. Filed Jan. 31, 1958, Ser. No. 712,291
6 Claims. (Cl. 167—22)

The present invention relates to dihalogenopropynes as soil fumigants and particularly to a method of controlling and eradicating soil nematodes attacking chlorophyllaceous plants while employing the said dihalogenopropynes.

It is known that 3-chloro-1-iodo-1-propyne has been suggested as a soil fumigant for the control of nematodes. Actual tests, however, have demonstrated that this compound has a relatively low killing rate and requires a period of at least six hours to give a 50% kill in a concentration of 1,000 parts per million of aqueous emulsion.

In view of the fact that 3-chloro-1-iodo-1-propyne has some killing power, it was assumed, and reasonably so, that 1-bromo-3-chloro-1-propyne would also exhibit some killing power and that it might be employed as an alternative soil fumigant. Actual laboratory and field tests showed that this particular compound is in the same category as 3-chloro-1-iodo-1-propyne, i.e. a kill of only about 50% is obtained when employed in a concentration of 1,000 parts per million of aqueous emulsion.

Further experimentation and field tests revealed that 1,3-dichloropropyne was ineffective as a nematocide during a period of six hours contact time. From the nine theoretically possible dihalogenopropynes, exclusive of compounds containing fluorine, I found that only three isomers thereof show the unexpected property of functioning efficiently as soil nematocides with a 100% kill obtainable within one to four hours of contact time. Indeed it was very surprising and unexpected that 1,3-dibromopropyne functions as an efficient nematocide, whereas its dichloro isomer, 1,3-dichloropropyne, is ineffective. It was also surprising and unexpected that 3-bromo-1-iodo-1-propyne and 3-bromo-1-chloro-1-propyne are very effective, whereas the isomer, 1-bromo-3-chloro-1-propyne, is ineffective.

It is an object of the present invention to provide a method of controlling and eradicating soil nematodes, which have the tendency to attack and injure chlorophyllaceous plant materials, by means of certain species of dihalogenopropynes as the active soil fumigants.

Other objects and advantages will become more clearly apparent from the following description.

The foregoing objects are accomplished by utilizing, in nematocidal amounts, dihalogenopropynes having the following general formula:

$$XC\equiv CCH_2Br$$

wherein X represents a halogen, i.e. bromine, chlorine or iodine.

As examples of the species of dihalogenopropynes falling within the scope of the foregoing formula, the following are illustrative:

$$BrC\equiv CCH_2Br$$

(Lespieau, Ann. Chim. (7), 11, 269, 1897)

(1)     1,3-dibromopropyne $$IC\equiv CCH_2Br$$

(Hatch et al., J. Am. Chem. Soc., 77, 126–7, 1955)

(2)     3-bromo-1-iodo-1-propyne $$ClC\equiv CCH_2Br$$

(3)     3-bromo-1-chloro-1-propyne

The latter compound, i.e., 3-bromo-1-chloro-1-propyne, was prepared in the following manner:

A 2-liter flask fitted with an agitator and thermometer was charged with 733 grams of an aqueous solution containing 37.5 grams (0.504 mole) of sodium hypochlorite. This solution was cooled to 5 to 10° C. and 30 grams (0.252 mole) of propargyl bromide slowly added and the mixture stirred for four hours. The reaction mixture was extracted with ether. After separation of the ethereal layer, the solvent was removed by evaporation. The resulting 3-bromo-1-chloro-1-propyne was not spontaneously flammable in air.

*Analysis.*—Calc.: Cl, 23.11; Br, 52.09. Found: Cl, 21.35, Br, 53.60.

For the purpose of comparing the nematocidal efficiency of the foregoing compounds with related isomers, the following isomers were employed:

$$ClC\equiv CCH_2Cl$$

(4)     1,3-dichloropropyne $$BrC\equiv CCH_2Cl$$

(Hatch et al., J. Amer. Chem. Soc. 76, 289–90, 1954)

(5)     1-bromo-3-chloro-1-propyne $$IC\equiv CCH_2Cl$$

(U.S.P. 2,749,377)

(6)     3-chloro-1-iodo-1-propyne

The 1,3-dichloropropyne was prepared in the following manner:

Into a 2-liter flask fitted with an agitator and thermometer was charged 700 grams of an aqueous solution containing 37.0 grams (0.496 mole) of sodium hypochlorite. This solution was cooled to 5 to 10° C. and 37 grams (0.496 mole) of propargyl chloride was added over a period of two hours. The reaction mixture was stirred for three hours and then extracted with diethyl ether. After separation of the ethereal layer, the product was isolated by distilling off the solvent. The resulting 1,3-dichloropropyne was not spontaneously flammable in air.

*Analysis.*—Calc.: Cl, 65.1. Found: Cl, 63.5.

The following examples will illustrate the manner in which the dihalogenopropynes characterized by the foregoing general formula may be employed in the control and eradication of all species of nematodes together with their efficiency when compared with related isomers:

EXAMPLE I

A sufficient quantity of each of the compounds (1) to (6), to give a final concentration of 1,000 parts per million and 100 parts per million respectively, was dissolved in 3 cc. of acetone. To this solution 3 cc. of 1% aqueous emulsifier "Igepal" (obtained by condensing 1 mole of nonyl phenol with 9–10 moles of ethylene oxide) was added, followed by enough water to give a final volume of 15 cc. Ten pre-adult nematodes, *Panagrellus redivivus*, were immersed in the aqueous emulsion of each of six dihalogenopropynes while an additional 10 pre-adult nematodes were placed in a vehicular emulsion ("Igepal" emulsifier and water) as controls. The activity of each of the six dihalogenopropyne compounds was based on the time required for total inactivation of all 10 nematode specimens, determined after tests to incite motion. The results obtained after immersion (1) are shown in the following table:

For field application, it is advisable that the 1,3-dibromopropyne; 3-bromo-1-iodo-1-propyne and 3-bromo-1-chloro-1-propyne be applied either in concentrated form or in dilute solution when the soil temperature is between 40 to 80° F.

*Table*

| Nematocide | Conc. in p.p.m. | 15 min. | | 30 min. | | 1 hr. | | 1.5 hrs. | | 2 hrs. | | 4 hrs. | | 6 hrs. | |
|---|---|---|---|---|---|---|---|---|---|---|---|---|---|---|---|
| | | $NM_2$ | $TI_3$ | NM | TI | NM | TI | NM | TI | NM | TI | NM | TI | NM | TI |
| (1) 1,3-dibromopropyne | 1,000 | 1 | 0 | 3 | 0 | 3 | 0 | 6 | 0 | 10 | 10 | | | | |
| | 100 | 0 | 0 | 0 | 0 | 2 | 0 | 2 | 0 | 2 | 0 | 10 | 6 | 10 | 10 |
| (2) 3-bromo-1-iodo-1-propyne | 1,000 | 10 | 10 | | | | | | | | | | | | |
| | 100 | 1 | 0 | 10 | 9 | 10 | 10 | | | | | | | | |
| (3) 3-bromo-1-chloro-1-propyne | 1,000 | 10 | 0 | 6 | 4 | 7 | 4 | 8 | 4 | 10 | 5 | 10 | 10 | | |
| | 100 | 0 | 0 | 0 | 0 | 0 | 0 | 0 | 0 | 0 | 0 | 7 | 4 | 8 | 5 |
| (4) 1,3-dichloropropyne | 1,000 | 0 | 0 | 0 | 0 | 0 | 0 | 0 | 0 | 0 | 0 | 0 | 0 | 0 | 0 |
| | 100 | 0 | 0 | 0 | 0 | 0 | 0 | 0 | 0 | 0 | 0 | 0 | 0 | 0 | 0 |
| (5) 1-bromo-3-chloro-1-propyne | 1,000 | 0 | 0 | 0 | 0 | 0 | 0 | 0 | 0 | 3 | 0 | 3 | 1 | 5 | 3 |
| | 100 | 0 | 0 | 0 | 0 | 0 | 0 | 0 | 0 | 0 | 0 | 0 | 0 | 0 | 0 |
| (6) 3-chloro-1-iodo-1-propyne | 1,000 | 0 | 0 | 0 | 0 | 0 | 0 | 0 | 0 | 3 | 1 | 5 | 2 | 6 | 4 |
| | 100 | 0 | 0 | 0 | 0 | 0 | 0 | 0 | 0 | 0 | 0 | 0 | 0 | 0 | 0 |
| Control | | 0 | 0 | 0 | 0 | 0 | 0 | 0 | 0 | 0 | 0 | 0 | 0 | 0 | 0 |

(1) Immediately after all 10 test animals were immersed in a candidate preparation a check was kept on the time. After each of the time intervals listed, the nematodes were examined.
(2) NM—Non-motile is the term used to refer to those animals which became completely quiescent. Certain tests were applied to these animals in order to determine whether they were totally inactivated or whether they were capable of further motion.
(3) TI—Totally inactivated is the term used to refer to those animals which became completely quiescent and were incapable of further motion after the completion of the tests referred to above. For all practical purposes, these animals can be considered dead.

From the foregoing table, it is clearly evident, that the first three compounds give 100% nematocidal kill within 15 minutes to four hours at a concentration of 1,000 parts per million whereas the latter three compounds are only about one-half effective as nematocides after a contact time of six hours.

EXAMPLE II

Each one of the six dihalogenopropynes enumerated in the foregoing table was dispersed in water by means of the "Igepal" emulsifier of Example I to yield an emulsion containing 50, 10 and 5 grams respectively, of the dihalogenopropyne per liter of emulsion. The emulsions were applied to concentrated loam soil which was heavily infested with root knot nematodes. The rate of application corresponded to concentrations of approximately 50, 10 and 5 parts respectively, of each of the six dihalogenopropynes per million parts per weight of soil.

About one month after treatment, the soil was seeded with tomatoes. As a control, untreated plots were also planted with tomatoes. Five weeks after planting, the plants were lifted from the soil and the roots examined for gall formation. The control plots and the plots treated with 1,3-dichloropropyne; 1-bromo-3-chloro-1-propyne and 3-chloro-1-iodo-1-propyne were stunted and their roots covered with galls. The roots of the plants grown in soil treated with 1,3-dibromopropyne; 3-bromo-1-iodo-1-propyne and 3-bromo-1-chloro-1-propyne were free from galls.

EXAMPLE III

A determination similar to that of Example II was carried out in a clay loam-type soil which was heavily infested with sugar beet nematodes. The soil was treated with each one of the six enumerated dihalogenopropynes in emulsion form at the rate of 50, 10 and 5 parts respectively, of the dihalogenopropyne per million parts of soil by weight. About one month after treatment, the plot was planted with young sugar beet plants. At the same time an untreated control was also planted with the same sugar beet plants. Eight weeks after planting, the plants were examined for nematode attack. The plants grown in the control plot and the plots grown in soil treated with 1,3-dichloropropyne; 1-bromo-3-chloro-1-propyne and 3-chloro-1-iodo-1-propyne, were stunted, whereas, the plants grown in soil treated with 1,3-dibromopropyne; 3-bromo-1-iodo-1-propyne and 3-bromo-1-chloro-1-propyne yielded normal healthy plants.

From numerous field tests, I have found that satisfactory results are obtained in the control of cyst-forming nematodes, endoparasitic nematodes, ectoparasitic nematodes and background feeders such as *Aphelenchoides ritzema-bosi* on the following vegetables and small fruits:

| | |
|---|---|
| Asparagus | Eggplant |
| Bean, lima | Lettuce |
| Bean, snap | Okra |
| Broccoli | Parnsip |
| Brussels sprouts | Pea |
| Cabbage | Radish |
| Cantaloupe | Spinach |
| Carrot | Squash |
| Cauliflower | Strawberry |
| Celery | Tomato |
| Corn, sweet | Turnip |
| Cucumber | Watermelon |

When the nematocides of the present invention are employed in amounts ranging from five to fifty pounds per acre, it is to be noted that the amount for each species of nematodes may vary, amounts as little as five pounds per acre being sufficient to control *Heterodera glycines*. Accordingly, the nematocidal amount for each species should be determined by simple routine tests while following the procedures of the foregoing working examples and standard procedures outlined in textbooks or nematology or plant pathology.

By the term "halogen" as used in the appended claims is meant only chlorine, bromine or iodine.

I claim:
1. The method of protecting chlorophyllaceous plants against soil nematodes which comprises contacting said nematodes with a nematocidal amount of a nematocide having the following general formula:

$$XC\equiv CCH_2Br$$

wherein X represents a halogen selected from the group consisting of chlorine, bromine and iodine.

2. The method of fumigating soil which comprises introducing to the soil a fumigating amount of a fumigant having the following general formula:

$$XC\equiv CCH_2Br$$

wherein X represents a halogen selected from the group consisting of chlorine, bromine and iodine.

3. A process of controlling and eradicating nematodes from soil which comprises introducing to the said soil a nematocidal amount of a nematocide having the following general formula:

$$XC\equiv CCH_2Br$$

wherein X represents a halogen selected from the group consisting of chlorine, bromine and iodine.

4. The process according to claim 1 wherein the nematocide is 1,3-dibromopropyne.

5. The process according to claim 1 wherein the nematocide is 3-bromo-1-iodo-1-propyne.

6. The process according to claim 1 wherein the nematocide is bromo-1-chloro-propyne.

References Cited in the file of this patent

UNITED STATES PATENTS

| | | |
|---|---|---|
| 2,411,566 | Evans | Nov. 26, 1946 |
| 2,415,251 | Leavitt | Feb. 4, 1947 |
| 2,421,507 | Jones | June 3, 1947 |
| 2,502,244 | Carter | Mar. 28, 1950 |
| 2,695,859 | Hilmer | Nov. 30, 1954 |
| 2,749,377 | Johnston | June 5, 1956 |
| 2,794,727 | Barrons | June 4, 1957 |
| 2,849,365 | Youngson | Aug. 26, 1958 |

OTHER REFERENCES

Agr. and Food Chem., vol. 5, No. 3, March 1958, p. 160.

UNITED STATES PATENT OFFICE
CERTIFICATE OF CORRECTION

Patent No. 3,018,218                                January 23, 1962

William E. Duggins

It is hereby certified that error appears in the above numbered patent requiring correction and that the said Letters Patent should read as corrected below.

Column 4, line 56, for "or" read -- on --; column 5, lin 15, for "bromo-1-chloro-propyne" read -- 3-bromo-1-chloro-propyne --.

Signed and sealed this 29th day of May 1962.

(SEAL)
Attest:

ERNEST W. SWIDER                                DAVID L. LADD
Attesting Officer                                    Commissioner of Patents